United States Patent
Chang

(10) Patent No.: US 9,180,928 B2
(45) Date of Patent: Nov. 10, 2015

(54) BRAKE SYSTEM WITH LINKING EFFECT

(71) Applicant: Jui-Lung Chang, Tainan (TW)

(72) Inventor: Jui-Lung Chang, Tainan (TW)

(*) Notice: Subject to any disclaimer, the term of this patent is extended or adjusted under 35 U.S.C. 154(b) by 0 days.

(21) Appl. No.: 14/240,010

(22) PCT Filed: Oct. 23, 2012

(86) PCT No.: PCT/CN2012/083352
§ 371 (c)(1),
(2) Date: Feb. 20, 2014

(87) PCT Pub. No.: WO2013/177892
PCT Pub. Date: Dec. 5, 2013

(65) Prior Publication Data
US 2015/0068854 A1  Mar. 12, 2015

(30) Foreign Application Priority Data
May 28, 2012 (CN) .......................... 2012 1 0169884

(51) Int. Cl.
*B62L 1/06* (2006.01)
*B62L 3/08* (2006.01)
*B62L 3/02* (2006.01)

(52) U.S. Cl.
CPC .... *B62L 3/08* (2013.01); *B62L 3/02* (2013.01)

(58) Field of Classification Search
USPC ........ 188/24.14–24.22; 74/489, 500.5–501.6, 74/502.6
See application file for complete search history.

(56) References Cited

U.S. PATENT DOCUMENTS

| | | | |
|---|---|---|---|
| 5,339,929 A * | 8/1994 | Chern | 188/24.16 |
| 6,523,649 B1 * | 2/2003 | Juan | 188/24.16 |
| 6,662,675 B2 * | 12/2003 | Lee et al. | 74/500.5 |
| 8,261,887 B2 * | 9/2012 | Tseng | 188/24.22 |
| 2002/0175028 A1 * | 11/2002 | Liu | 188/24.21 |
| 2010/0300817 A1 * | 12/2010 | Chiang | 188/24.16 |
| 2012/0234633 A1 * | 9/2012 | Lu et al. | 188/24.22 |

FOREIGN PATENT DOCUMENTS

| | | |
|---|---|---|
| CN | 1200341 A | 12/1998 |
| CN | 1436692 A | 8/2003 |
| CN | 201472594 U | 5/2010 |
| CN | 101927810 A | 12/2010 |
| CN | 201989909 U | 9/2011 |
| GB | 2 349 435 A | 11/2000 |
| JP | 2009-12660 A | 1/2009 |

* cited by examiner

*Primary Examiner* — Christopher Schwartz
(74) *Attorney, Agent, or Firm* — Maschoff Brennan

(57) ABSTRACT

A brake system with linking effect includes rear-wheel and front-wheel brake devices. The rear-wheel brake device includes a first rotating member, a first shifting member allocated in the first rotating member, and a first drawing member encircling the first rotating member at a first connecting radius. The rear-wheel brake device is drawn by the first drawing member and rotated from a first initial position. The front-wheel brake device includes a second rotating member, a second shifting member allocated in the second rotating member, and a second drawing member encircling the second rotating member at a second connecting radius. The front-wheel brake device is drawn by the first drawing member to rotate from a second initial position to perform a braking operation. The first and second shifting members are configured, to allow the first shifting member to draw the rear-wheel brake device to synchronously brake the front and rear wheels.

10 Claims, 5 Drawing Sheets

BRAKE SYSTEM WITH LINKING EFFECT

FIELD OF THE INVENTION

The present invention relates to a brake system for a bicycle, and more particularly to a brake system with linking effect which brakes a bicycle's rear wheel before a front wheel.

BACKGROUND OF THE INVENTION

With the popularity of the sport of cycling, there are more and more people riding bicycles for recreation. In a conventional bicycle brake system, the braking operation is driven by a rider who presses brake levers installed on handles, and the front and rear wheels will be braked accordingly. The conventional bicycle brake system performs the braking operation for each individual brake of front wheel and rear wheel. In other words, when only one of the levers is being pressed, it drives only the brake connected to that lever. The brake levers in related to a front wheel or a rear wheel are arbitrarily installed on left side handle and right side handle depending on every different manufacturer, so therefore when a rider with less physical reaction in choosing which wheel should be braked may cause an emergency incident, because of his/her wrong choosing of brake lever.

Accordingly, a rider pressing a wrong brake lever during a high speed riding may causes a flip over of a bicycle. Because if, in a high speed riding, a front wheel is suddenly braked prior to a rear wheel, the inertia force from the rear wheel will overwhelm the braking force in the front wheel to thus cause a flip over.

In addition, since a gravity center of bicycle is allocated on a frame body, the balancing itself is complicated. An emergency situation will let it even more complicated, since a rider becomes difficult to make a prompt analysis in such a rush moment to determine whether a front wheel, a rear wheel or both wheels should be braked. Moreover, to remember which brake lever corresponds to which wheel is another problem that a ride may not be able to react. Moreover, if a rider only brakes the rear wheel, it may cause the non-braked front wheel driving the bicycle to run a unexpected distance, which may also cause an accident.

SUMMARY OF THE INVENTION

The present invention is provided for solving the above drawbacks of the conventional brake system of a bicycle. The drawbacks, which usually happens in a high speed riding, includes:

1) The hazard results from only braking the front wheel. A gravity center of bicycle becomes lower when the front wheel is braked, and a thrusting force from the moving rear wheel will lift a rear side of bicycle to cause the bicycle to flip over.

2) The risk results from only braking the rear wheel. Although the rear wheel has been braked and stopped, but the front wheel remains moving forward in a high speed to thus keep the bicycle running for an unexpected distance to cause a safety threat.

In spite that there are well-known technologies that employ a brake system for braking the front wheel and the rear wheel synchronously, including the employment of a pulley mechanism, an oil cylinder, a ratchet mechanism or even a piston mechanism, there still have some disadvantages such as being too large in size to become not suitable for installing on a bicycle frame, being easy to scratch the frame surface due to its back and forth sliding operation, or being complicated for installation because of a large amount of part elements.

Accordingly, the present invention is to provide a brake system with linking effect that overcomes the aforementioned drawbacks of the conventional bicycle brake system.

The present invention provides a safety brake system that brakes a rear wheel before a front wheel, so as to further enhance the riding safety of a bicycle rider.

The brake system with linking effect of the present invention comprises a rear-wheel brake device and a front-wheel brake device.

According to an aspect of the present invention, the rear-wheel brake device includes a first rotating member, a first shifting member which is allocated in the first rotating member, and a first drawing member encircling the first rotating member that is with a first radius, wherein the rear-wheel brake device is drawn by the first drawing member to launch a rotation to brake a rear wheel from a first initial position.

According to an aspect of the present invention, the front-wheel brake device including a second rotating member, a second shifting member which is allocated in the second rotating member, and a second drawing member encircling the second rotating member that is with a second radius, wherein the front-wheel brake device is drawn by the first shifting member to launch a rotation to brake a front wheel from a second initial position.

According to an aspect of the present invention, the first shifting member and the second shifting member are assembled by slide-fitting each other in a sliding buffer space between the first shifting member and the second shifting member, so as to allow the first shifting member to draw the front-wheel brake device to perform braking operation.

According to an aspect of the present invention, the second radius is larger than first radius, so as to allow the second drawing member and the first drawing member brake the front wheel and the rear wheel in a substantially synchronous manner.

According to an aspect of the present invention, the first rotating member returns the first shifting member back to the first initial position, and/or the second rotating member returns the second shifting member back to the second initial position.

According to an aspect of the present invention, the first rotating member and the second rotating member are coaxial.

According to an aspect of the present invention, the first shifting member is an engaging projecting element and the second shifting member is an engaging groove element.

According to an aspect of the present invention, the first shifting member is an engaging groove element and the second shifting member is an engaging projecting element.

According to an aspect of the present invention, the rear-wheel brake device is for braking the rear wheel and the front-wheel brake device is for braking the front wheel.

According to an aspect of the present invention, the first drawing member and the second drawing member are brake cables.

According to an aspect of the present invention, a first rotating element of the first rotating member and a second rotating element of the second rotating member are coaxially and are respectively installed on inner portions of the rotating member and the second rotating member.

According to an aspect of the present invention, the first shifting member and the second shifting member are installed on outer portions of the first rotating member and the second rotating member.

According to an aspect of the present invention, the first drawing member and the second drawing member draws outer sections of the rear-wheel brake device and the front-wheel brake device.

With the characteristic features of the present invention as above, a braking operation is able to prevent the front wheel from being braked prior to the rear wheel. Since both front and rear brakes are controlled by the rear-wheel brake device and the front-wheel brake device, a braking operation that brakes the rear wheel prior to the front wheel can be operated effectively. In the present invention, the rear wheel will be braked immediately, and the front wheel will be braked 0.1 to 0.2 seconds later so as to prevent from the danger of wrong pulling of the lever.

Moreover, the mechanism of braking the front and rear wheels non-synchronously prevents a rider from being thrown away by the inertia force. The brake system of the present invention is applicable to any type of bicycles, and either the front or rear-wheel brake device can be used to control the wheels to thus effectively prevents a rider from mistakenly braking the front wheel during a high speed riding or in a unexpected dangerous situation.

BRIEF DESCRIPTION OF THE DRAWINGS

The technical means adopted by the present invention to achieve the above and other objects can be best understood by referring to the following detailed description of the preferred embodiments and the accompanied drawings.

DETAILED DESCRIPTION OF EMBODIMENTS

Hereinafter, a preferable embodiment of the present invention is explained with reference to FIGS. 1 to 4, and the scope of the present invention is not limited to the following embodiment.

Figure 3:
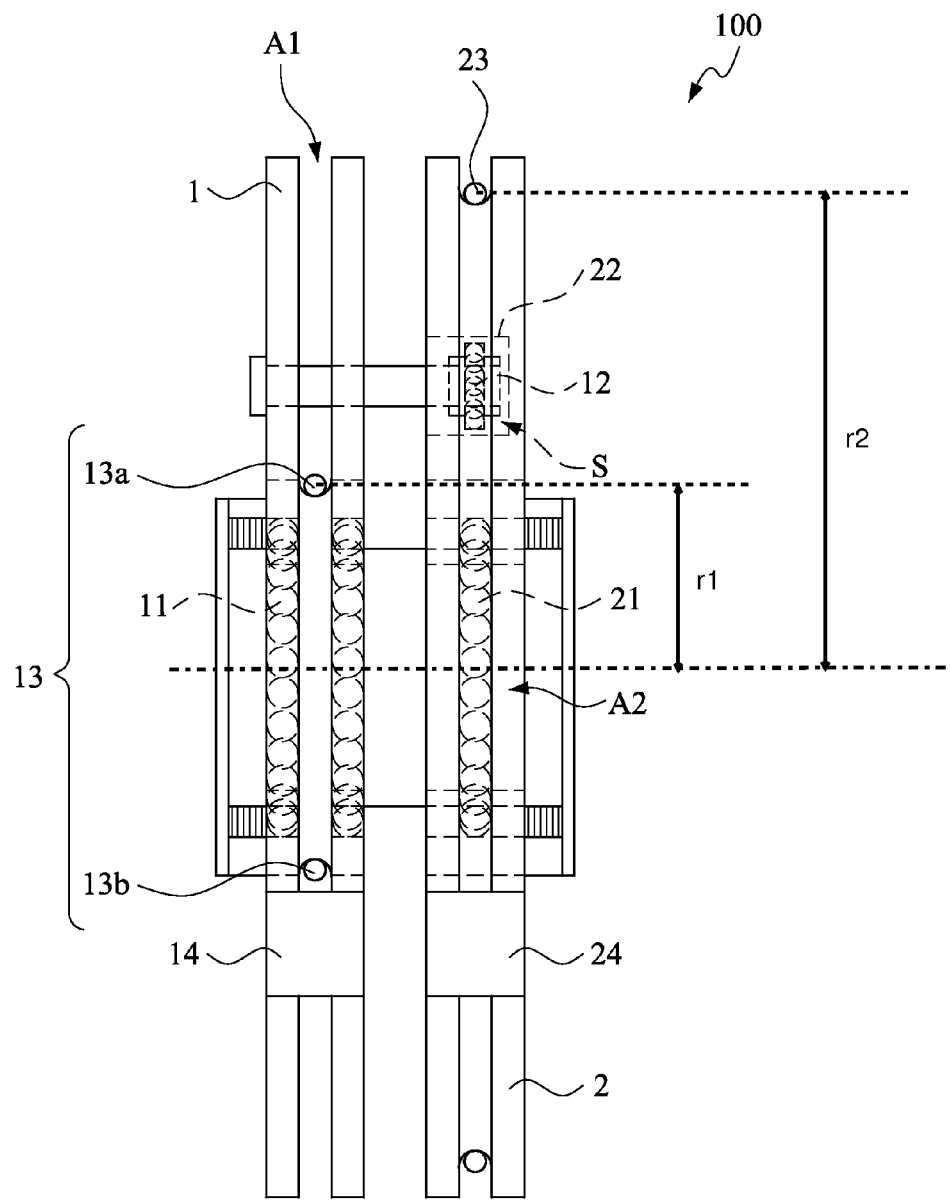
FIG. 3 is a top view illustrating the brake system with linking effect of the present invention.

In an embodiment, the brake system with linking effect 100 of the present invention is installed on a bicycle B. The brake system with linking effect 100 includes a rear-wheel brake device 1 and a front-wheel brake device 2, wherein the rear-wheel brake device includes a first rotating member 11, a first shifting member 12 which is allocated in the first rotating member 11, and a first drawing member 13 encircling the first rotating member 11 that is with a first connecting radius r1 as shown in FIG. 3. On the other hand, the front-wheel brake device 2 includes a second rotating member 21, a second shifting member 22 which is allocated in the second rotating member 21, and a second drawing member 23 encircling the second rotating member 21 that is with a second connecting radius r2 as shown in FIG. 3, in which r2>r1.

Figure 1:
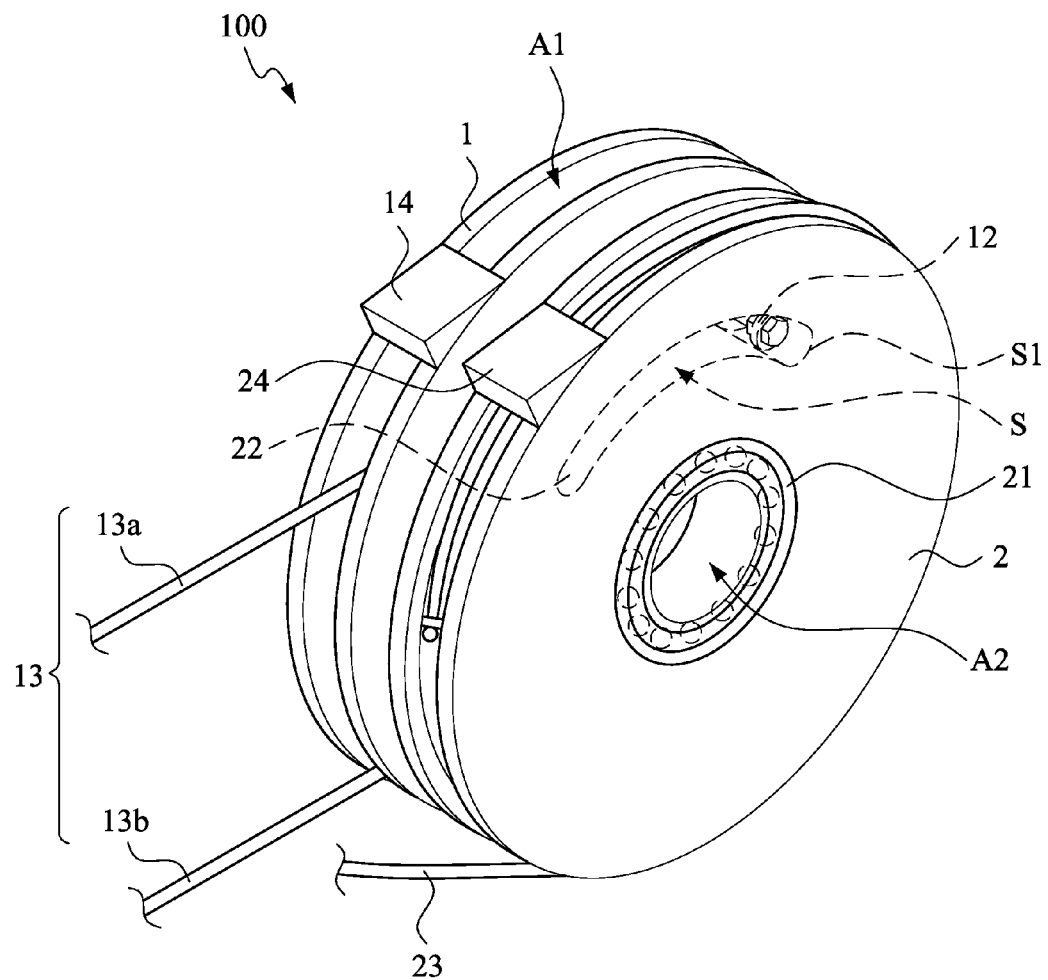
FIG. 1 is a front view illustrating the brake system with linking effect of the present invention.
Figure 2:
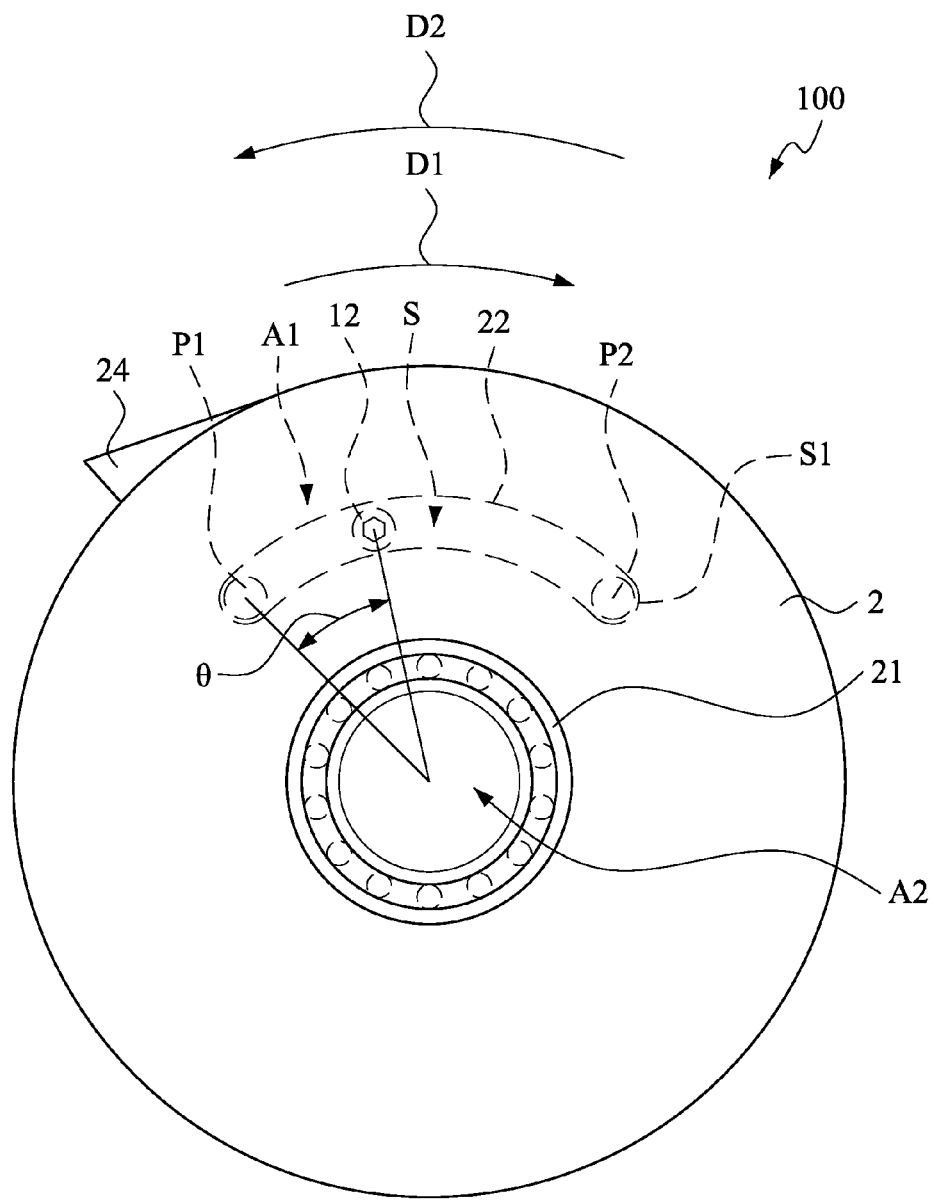
FIG. 2 is another front view illustrating the brake system with linking effect of the present invention.

In this embodiment, the first drawing member 13 and the second drawing member 23 of the present invention are brake cables as shown in FIGS. 1 and 2, wherein the first drawing member 13 includes an upper drawing member 13a and a lower drawing member 13b, which are separate to each other. One end of the upper drawing member 13a of the first drawing member 13 is connected to both of a right brake lever B1 and a left brake lever B3, and another end of the upper drawing member 13a is connected to the first rotating member 11 as show in FIG. 1. One end of the lower drawing member 13b is connected to the first rotating member 11, and another end is connected to a rear-wheel brake B2. One end of the second drawing member 23 is connected to the second rotating member 21, and another end is connected to a front-wheel brake B4. By means of above configuration, the rear-wheel brake device 1 is for braking a rear wheel, and the front-wheel brake device 2 is for braking a front wheel. In this embodiment, the rear-wheel brake device 1 further includes a bumping member 14, and the front-wheel brake device 2 further includes a bumping member 24, wherein the function of bumping member 14 and 24 is to prevent the rear-wheel brake device 1 and front-wheel brake device 2 from over rotating when the front-wheel brake and the rear-wheel brake are released. The first drawing member 13 and the second drawing member 23 draw an outer sections W of the rear-wheel brake device 1 and the front-wheel brake device 2.

Figure 4:
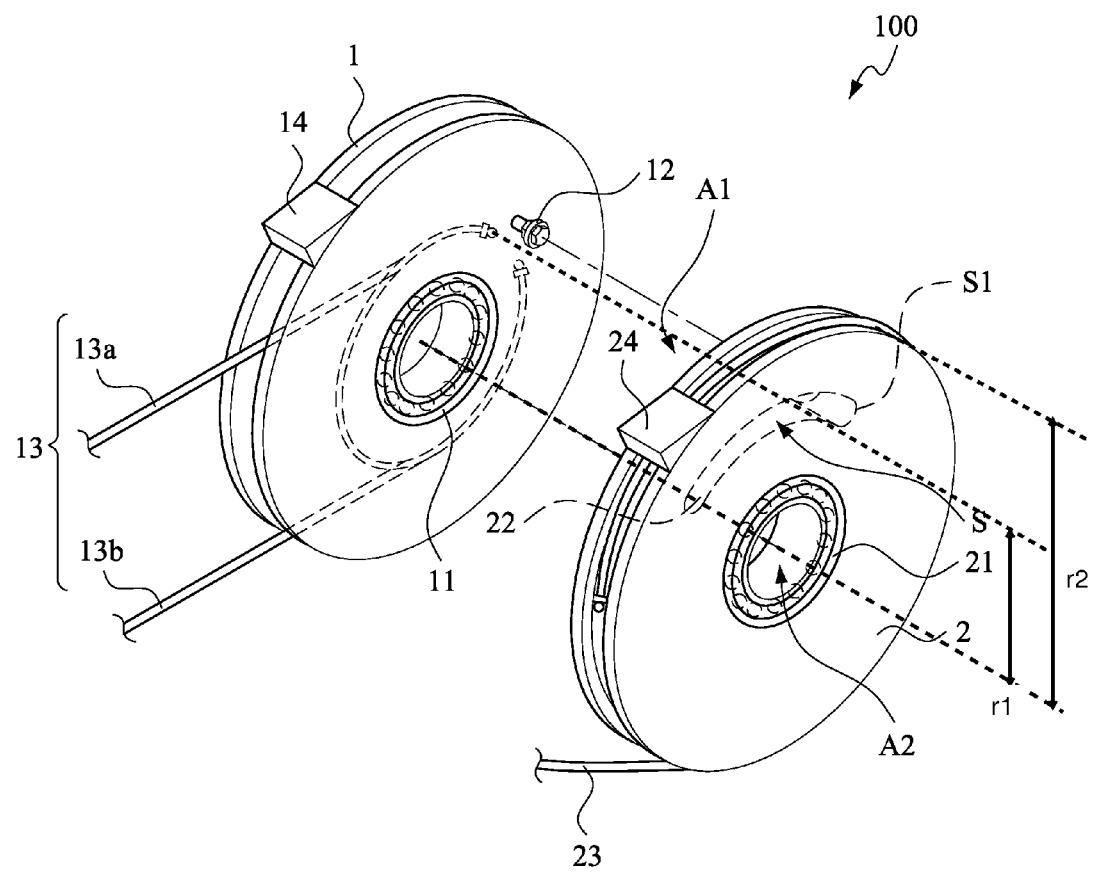
FIG. 4 is a schematic diagram illustrating an example of applying the present invention on a bicycle.
Figure 5:
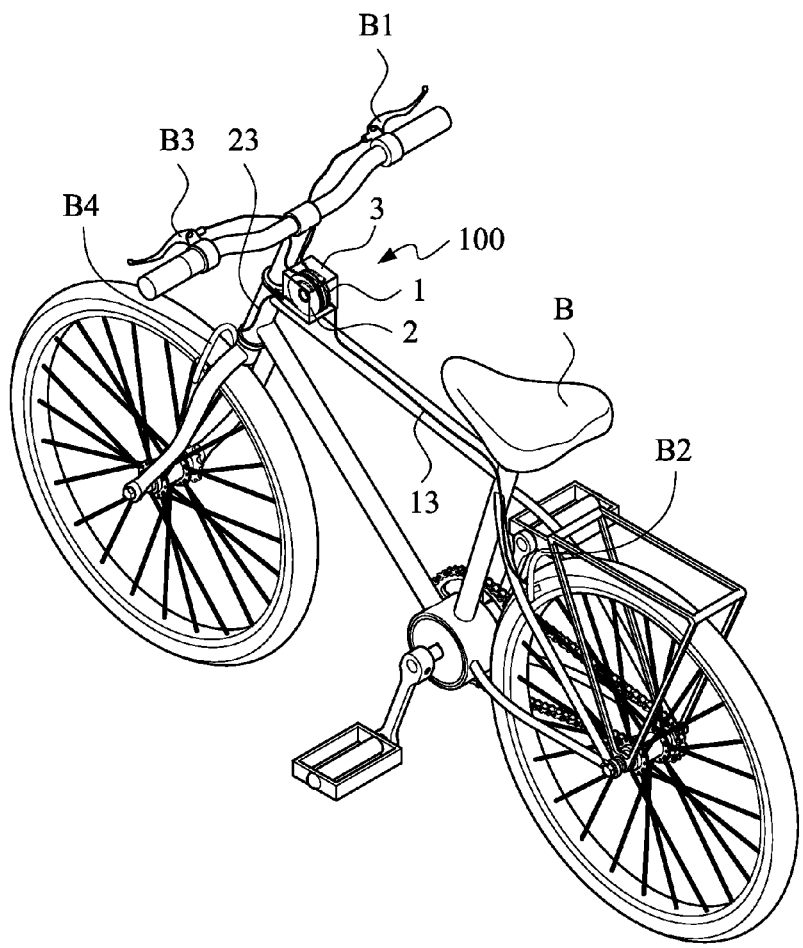
FIG. 5 is a schematic diagram illustrating an example of applying the present invention on a bicycle.

As shown in the FIG. 3 and FIG. 4, the rear-wheel brake device 1 and the front-wheel brake device 2 both has an outer portion A1 and an inner portion A2.

A first rotating element 18 of the first rotating member 11 and a second rotating element 28 of the second rotating member 21 are coaxially installed on the inner portions A2 of the rear-wheel brake device 1 and the front-wheel brake device 2. On the other hand, the first shifting member 12 and the second shifting member 22 are respectively installed on the outer portions A1 of the rear-wheel brake device 1 and the front-wheel brake device 2. In this embodiment, the first shifting member 12 is an engaging projecting element and the second shifting member 22 is an engaging groove element, wherein the first shifting member 12 can be sliding and engaging with the second shifting member 22 as covered within the front-wheel brake device 2 as illustrated in FIGS. 1 and 2 as the broken line portion.

It can be understood that in another embodiment the first shifting member can be an engaging groove element and a second shifting member can be an engaging projecting element. Meanwhile, the first drawing member 13 and the second drawing member 23 are provided to pull the outer portions A1 of the rear-wheel brake device 1 and front-wheel brake device 2 to thus achieve a connection to a right brake lever B1, a rear-wheel brake B2, a left brake lever B3, and a front-wheel brake B4.

By means of the present invention, when a rider presses either the right brake lever B1 or the left brake lever B3, or presses both levers together, a pulling force that is transferred to the rear-wheel brake device 1 and the front-wheel brake device 2 through the first drawing member 13 and the second drawing member 23 will drive the first shifting member 12 and the second shifting member 22 that are slide-fitting with each other. The first shifting member 12 that is installed on the first rotating member 11 is initially slide with respect to the second shifting member 22 from a first initial position P1 of the rear-wheel brake device 1. If the pulling force continues, the first shifting member 12 will be slide to a position where it is a second initial position P2 of the front-wheel brake device 2, during which the first shifting member 12 is limited for the movement so that the against force will drive the second shifting member 22 to rotate the second rotating member 21. Accordingly, the driven rotating second rotating member 21 will drive the front-wheel brake B4 to brake.

In other words, when the right brake lever B1 and the left brake lever B3 are not pressed, there are no pulling force applied to the rear-wheel brake device 1 and the front-wheel brake device 2, so that the first shifting member 12 is at a first initial position P1 with respect to the second shifting member 22. When the right brake lever B1 or the left brake lever B3 is pressed, the upper drawing member 13a draws the rear-wheel brake device 1 from the first initial position P1 to the second initial position P2 if the pressing continues. Thereafter the upper drawing member 13a continues to draw the front-wheel brake device 2 to thus drag the second drawing member 23. In the present invention, the first shifting member 12 and the second shifting member 22 are slide-fitting with each other and are sharing a sliding space S (located inside a groove of the second shifting member 22). The present invention will perform the braking operation in a manner that the rear wheel is braked prior to the front wheel regardless of either the right brake lever B1 or the left brake lever B3 of the bicycle B is pressed.

In other words, by means of the sliding space S, the front-wheel brake B4 is driven by the front-wheel brake device 2 for a braking to thus complete the entire braking operation of the bicycle B. Meanwhile, as illustrated in FIG. 3, since the second radius r2 of the encircled second drawing member 23 with respect to the rotation axis is larger than the first radius r1 of the encircled first drawing member 13 with respect to the rotation axis, the pulling speed of the second drawing member 23 will be faster than the first drawing member 13 so that the front-wheel brake device 2 drives the front-wheel brake B4 for performing braking to the front wheel in a faster speed than that of the rear-wheel brake device 1. Accordingly, the front wheel braking and the rear wheel braking can be more synchronous. By means of adjusting an appropriate proportion ratio of the first radius r1 to the second radius r2, the front wheel and the rear wheel can be braked more synchronously in the entire braking operation of bicycle B.

In addition, when a rider stops pressing the right brake lever B1 and/or left brake lever B3, the first rotating member 11 will return the first shifting member back to the first initial position P1 with respect to the second shifting member 22.

By means of the above, the present invention prevents the situation that the front wheel is braked prior to the rear wheel. The present invention enables the rear-wheel brake device 1 and the front-wheel brake device 2 to control the front wheel braking and rear wheel braking. Moreover, the present invention enables to brake the front wheel and the rear wheel with different speeds to thus brake the both wheels synchronously to thus avoid a situation that a rear wheel is fully braked but the front wheel is not fully braked. Moreover, by the different braking speeds of the front wheel and the rear wheel, different applying forces can be applied to the front wheel and the rear wheel so that the braking procedure is more steady and avoid the accidents.

Moreover, the brake system with linking effect 100 of the present invention is able to be contained in a container 3 for being installed on a frame of the bicycle B, in which the installation position is not limited to the position as illustrated in FIG. 4.

As can be appreciated from the above embodiments, the brake system with linking effect of the present invention has industry worth which meets the requirement for a patent. The above description should be considered as only the discussion of the preferred embodiments of the present invention. However, a person with an ordinary skill in the art may make various modifications to the present invention, but such modifications still fall within the spirit and scope defined by the appended claims.

What is claimed is:

1. A brake system with linking effect, comprising:
a rear-wheel brake device including a first rotating member, a first shifting member which is allocated in the first rotating member, and a first drawing member encircling the first rotating member that is with a first connecting radius, wherein the rear-wheel brake device is drawn by the first drawing member to launch a rotation to brake a rear wheel from a first initial position; and
a front-wheel brake device including a second rotating member, a second shifting member which is allocated in the second rotating member, and a second drawing member encircling the second rotating member that is with a second connecting radius, wherein the front-wheel brake device is drawn by the first shifting member to launch a rotation to brake a front wheel from a second initial position,
wherein the rotation of the first rotating member and the rotation of the second rotating member are performed independently,
wherein the first shifting member and the second shifting member are assembled by slide-fitting each other in a sliding space between the first shifting member and the second shifting member, so as to allow the first shifting member to draw the front-wheel brake device to perform a braking operation, and
wherein the second connecting radius is larger than the first connecting radius, so as to allow the second drawing member and the first drawing member to brake the front wheel and the rear wheel synchronously.

2. The brake system with linking effect of claim 1, wherein the first rotating member returns the first shifting member back to the first initial position, and/or the second rotating member returns the second shifting member back to the second initial position.

3. The brake system with linking effect of claim 1, wherein the first rotating member and the second rotating member are coaxial.

4. The brake system with linking effect of claim 1, wherein the first shifting member is an engaging projecting element and the second shifting member is an engaging groove element.

5. The brake system with linking effect of claim 1, wherein the first shifting member is an engaging groove element and the second shifting member is an engaging projecting element.

6. The brake system with linking effect of claim 1, wherein the rear-wheel brake device is for braking the rear wheel and the front-wheel brake device is for braking the front wheel.

7. The brake system with linking effect of claim 1, wherein the first drawing member and the second drawing member are brake cables.

8. The brake system with linking effect of claim 1, wherein a first rotating element of the first rotating member and a second rotating element of the second member are coaxially and are respectively installed on inner portions of the first rotating member and the second rotating member.

9. The brake system with linking effect of claim 1, wherein the first shifting member and the second shifting member are installed on outer portions of the first rotating member and the second rotating member.

10. The brake system with linking effect of claim 9, wherein the first drawing member and the second drawing member draws outer sections of the rear-wheel brake device and the front-wheel brake device.

* * * * *